US007757126B2

(12) United States Patent
Vidiyala

(10) Patent No.: US 7,757,126 B2
(45) Date of Patent: Jul. 13, 2010

(54) SYSTEM AND METHOD FOR SUPPORTING SOFTWARE

(75) Inventor: Vijay Vidiyala, St. Leon (DE)

(73) Assignee: SAP AG, Walldorf (DE)

(*) Notice: Subject to any disclaimer, the term of this patent is extended or adjusted under 35 U.S.C. 154(b) by 579 days.

(21) Appl. No.: 11/738,224

(22) Filed: Apr. 20, 2007

(65) Prior Publication Data
US 2008/0263404 A1 Oct. 23, 2008

(51) Int. Cl.
G06F 11/00 (2006.01)
(52) U.S. Cl. .................. 714/38; 714/26; 714/57
(58) Field of Classification Search .......... 714/26, 714/38, 57
See application file for complete search history.

(56) References Cited

U.S. PATENT DOCUMENTS

| 5,499,366 | A | * | 3/1996 | Rosenberg et al. | 707/4 |
| 5,794,237 | A | * | 8/1998 | Gore, Jr. | 707/5 |
| 5,944,839 | A | * | 8/1999 | Isenberg | 714/26 |
| 6,012,056 | A | * | 1/2000 | Menlove | 707/5 |
| 6,177,932 | B1 | | 1/2001 | Galdes et al. | |
| 6,442,542 | B1 | * | 8/2002 | Ramani et al. | 707/3 |
| 6,560,589 | B1 | * | 5/2003 | Stier et al. | 706/45 |
| 6,571,236 | B1 | * | 5/2003 | Ruppelt | 707/3 |
| 6,629,267 | B1 | * | 9/2003 | Glerum et al. | 714/38 |
| 6,662,171 | B1 | * | 12/2003 | Goertz | 706/45 |
| 6,681,344 | B1 | * | 1/2004 | Andrew | 714/38 |
| 7,124,119 | B2 | * | 10/2006 | Bigus et al. | 706/10 |
| 7,203,881 | B1 | * | 4/2007 | Williams et al. | 714/741 |
| 7,231,550 | B1 | * | 6/2007 | McGuire et al. | 714/26 |
| 7,302,610 | B2 | * | 11/2007 | Arend | 714/26 |
| 7,360,125 | B2 | * | 4/2008 | Krebs | 714/48 |
| 7,379,846 | B1 | * | 5/2008 | Williams et al. | 702/185 |
| 7,418,628 | B2 | * | 8/2008 | Arend | 714/26 |
| 7,533,305 | B2 | * | 5/2009 | Behdjati et al. | 714/57 |
| 7,680,753 | B2 | * | 3/2010 | Sudhindra et al. | 706/45 |
| 7,689,872 | B2 | * | 3/2010 | Doyle et al. | 714/48 |
| 2003/0078900 | A1 | * | 4/2003 | Dool | 706/18 |
| 2003/0177414 | A1 | * | 9/2003 | Pillutla et al. | 714/25 |
| 2003/0177417 | A1 | * | 9/2003 | Malhotra et al. | 714/42 |
| 2004/0205421 | A1 | * | 10/2004 | Glerum et al. | 714/57 |
| 2005/0015678 | A1 | * | 1/2005 | Miller | 714/38 |
| 2005/0033626 | A1 | | 2/2005 | Kruse et al. | |
| 2005/0033631 | A1 | | 2/2005 | Wefers et al. | |
| 2005/0038832 | A1 | * | 2/2005 | Feigenbaum | 707/202 |
| 2005/0102567 | A1 | * | 5/2005 | McGuire et al. | 714/25 |
| 2005/0120273 | A1 | * | 6/2005 | Hudson et al. | 714/38 |
| 2005/0198556 | A1 | * | 9/2005 | Tripp et al. | 714/726 |

(Continued)

Primary Examiner—Robert Beausoliel
Assistant Examiner—Joshua P Lottich
(74) Attorney, Agent, or Firm—Fish & Richardson P.C.

(57) ABSTRACT

This disclosure provides various embodiments of software for supporting a business application. In one aspect, the software determines that a technical error associated with the business application has occurred, automatically communicates the technical error and dynamic context information to a remote support site, the dynamic context information at least partially identifying the particular execution point of the business application, receives one or more potential solutions for the technical error, the one or more potential solutions determined using at least the communicated technical error, dynamic context information, and static information collected at the support site; and presents the one or more potential solutions to a user of the business application via an interface. In some implementations, the software is further operable to prioritize the one or more presented potential solutions at least according to metrics associated with the one or more potential solutions.

15 Claims, 6 Drawing Sheets

U.S. PATENT DOCUMENTS

| | | | |
|---|---|---|---|
| 2005/0204215 A1* | 9/2005 | Tukiainen | 714/712 |
| 2005/0278213 A1* | 12/2005 | Faihe | 705/11 |
| 2006/0112106 A1 | 5/2006 | Wolf et al. | |
| 2006/0123278 A1* | 6/2006 | Dini et al. | 714/712 |
| 2006/0136784 A1* | 6/2006 | Prescott et al. | 714/38 |
| 2006/0143034 A1 | 6/2006 | Rothermel et al. | |
| 2006/0156077 A1* | 7/2006 | Altaf et al. | 714/57 |
| 2006/0259272 A1 | 11/2006 | Sattler et al. | |
| 2007/0038896 A1* | 2/2007 | Champlin et al. | 714/38 |
| 2007/0136342 A1 | 6/2007 | Singhai et al. | |
| 2007/0168691 A1* | 7/2007 | Srivastava et al. | 714/4 |
| 2007/0168758 A1* | 7/2007 | Kolb et al. | 714/46 |
| 2007/0168874 A1* | 7/2007 | Kloeffer et al. | 715/764 |
| 2007/0174731 A1* | 7/2007 | Haeberle et al. | 714/46 |
| 2007/0245174 A1* | 10/2007 | Gale et al. | 714/57 |
| 2007/0277061 A1* | 11/2007 | Ashe | 714/57 |
| 2008/0040299 A1* | 2/2008 | Faihe | 706/14 |
| 2008/0071703 A1* | 3/2008 | Evans | 705/36 T |
| 2008/0126110 A1* | 5/2008 | Haeberle et al. | 705/1 |
| 2008/0126887 A1* | 5/2008 | Brodeur et al. | 714/57 |
| 2008/0133435 A1* | 6/2008 | Chintalapti et al. | 706/12 |
| 2008/0141066 A1* | 6/2008 | Wood et al. | 714/4 |
| 2008/0172574 A1* | 7/2008 | Fisher | 714/25 |
| 2008/0184079 A1* | 7/2008 | Merriman et al. | 714/48 |
| 2008/0229160 A1* | 9/2008 | Prescott et al. | 714/57 |
| 2008/0250264 A1* | 10/2008 | Hourselt et al. | 714/2 |
| 2008/0250273 A1* | 10/2008 | Yilmaz et al. | 714/38 |
| 2008/0288534 A1* | 11/2008 | Reid et al. | 707/103 R |
| 2009/0013222 A1* | 1/2009 | Di Luoffo et al. | 714/57 |

* cited by examiner

SYSTEM AND METHOD FOR SUPPORTING SOFTWARE

TECHNICAL FIELD

This application relates to software support and, more particularly, to servicing, administering, or otherwise supporting business applications.

BACKGROUND

Organizations and businesses depend on software deployed throughout their computing infrastructures to perform the day-to-day tasks for their respective fields. Computing advances each day with smarter and faster computers, enhanced software capabilities, and better peripherals. Frequently, however, software users may experience performance and technical issues during operation of their systems. Depending on the software and the operating environment, these technical errors may be of varying complexity and occur frequently.

Some support solutions require a customer, or the individual using the software application, to report the error through a manual process. Upon receipt of the error report, the support provider may manually analyze the error, diagnose the problem, and determine the proper solution. Once found, the support provider may relay the solution to the customer, who may then attempt to implement the steps of the provided solution. In alternative support solutions, the customer may be given a phone number for a support provider's dedicated support hotline so that the customer may explain the errors received to a technical consultant of the support provider. In these situations, the customer generally needs a rudimentary level of knowledge regarding the software to ensure that the dialog between the technical consultant and the customer is clear enough to engage in finding a solution.

Other support solutions offer a searchable knowledge base to its customers. Thus, when an error occurs, the customer may manually search a listing of provided solution documentation for common errors that may occur with the software application. For more robust software applications, the related knowledge base may include multiple levels of solutions, requiring significant time and effort by customers to find, and then decipher, the correct solution. Even after locating a suitable solution, implementing the steps may be too difficult for customers without advanced knowledge of or access to the application. Further, a number of support providers offer a staffed help desk where customers may submit a ticket describing an error. The ticket is reviewed by a technical consultant who analyzes the error and attempts to provide solutions.

The set of current support solutions requires both customers and technical consultants to manually generate one or more potential solutions. Thus, customer support requires time- and resource-consuming actions. Some errors may occur frequently, providing the technical consultant with the experience necessary to quickly solve the customer's error. Other errors, however, may occur much less frequently, requiring the technical consultant or customer to spend large amounts of time searching for solutions relevant to the software error. For technical consultants, the location of infrequent error solutions may not be known and may be difficult to track down. For customers performing the search on their own, the occurrence of an infrequent error can often cause serious difficulty in finding a solution.

SUMMARY

This disclosure provides various embodiments of software for supporting a business application. In one aspect, the software determines that a technical error associated with the business application has occurred and automatically communicates the technical error and dynamic context information to a remote support site, wherein the dynamic context information at least partially identifies the particular execution point of the business application. The software then receives one or more potential solutions for the technical error. The one or more potential solutions are then determined using at least the communicated technical error, the dynamic context information, and static information collected at the support site. After receiving the one or more potential solutions, the software presents the one or more potential solutions to a user via an interface. In some implementations, tire software is further operable to prioritize the one or more presented potential solutions at least according to metrics associated with the one or more potential solutions.

In another aspect, the software receives a technical error and dynamic context information associated with a business application from a first client, the dynamic context information at least partially identifying the particular execution point of the business application, and then accesses static context information associated with the business application. The software then queries a solution repository containing one or more potential solutions The query can be determined using at least the received technical error, dynamic contest information, and accessed static context information. The software then automatically communicates the potential solutions returned by the query to the business application. In some situations, the software receives specific search criteria from the business application, queries the solution repository, wherein the query determined by the received specific search criteria, and automatically communicates the one or more potential solutions returned by the query to the business application. In still other situations, the software receives feedback associated with the returned one or more potential solutions from the business application.

While generally described as software, some or all of these aspects may be further included in respective systems or other devices for executing, implementing, or otherwise supporting a suitable software application. The details of these and other aspects and embodiments of the disclosure are set forth in the accompanying drawings and the description below. Other features, objects, and advantages of the preferred embodiment will be apparent from the description and drawings, and from the claims.

DETAILED DESCRIPTION

Figure 1A:
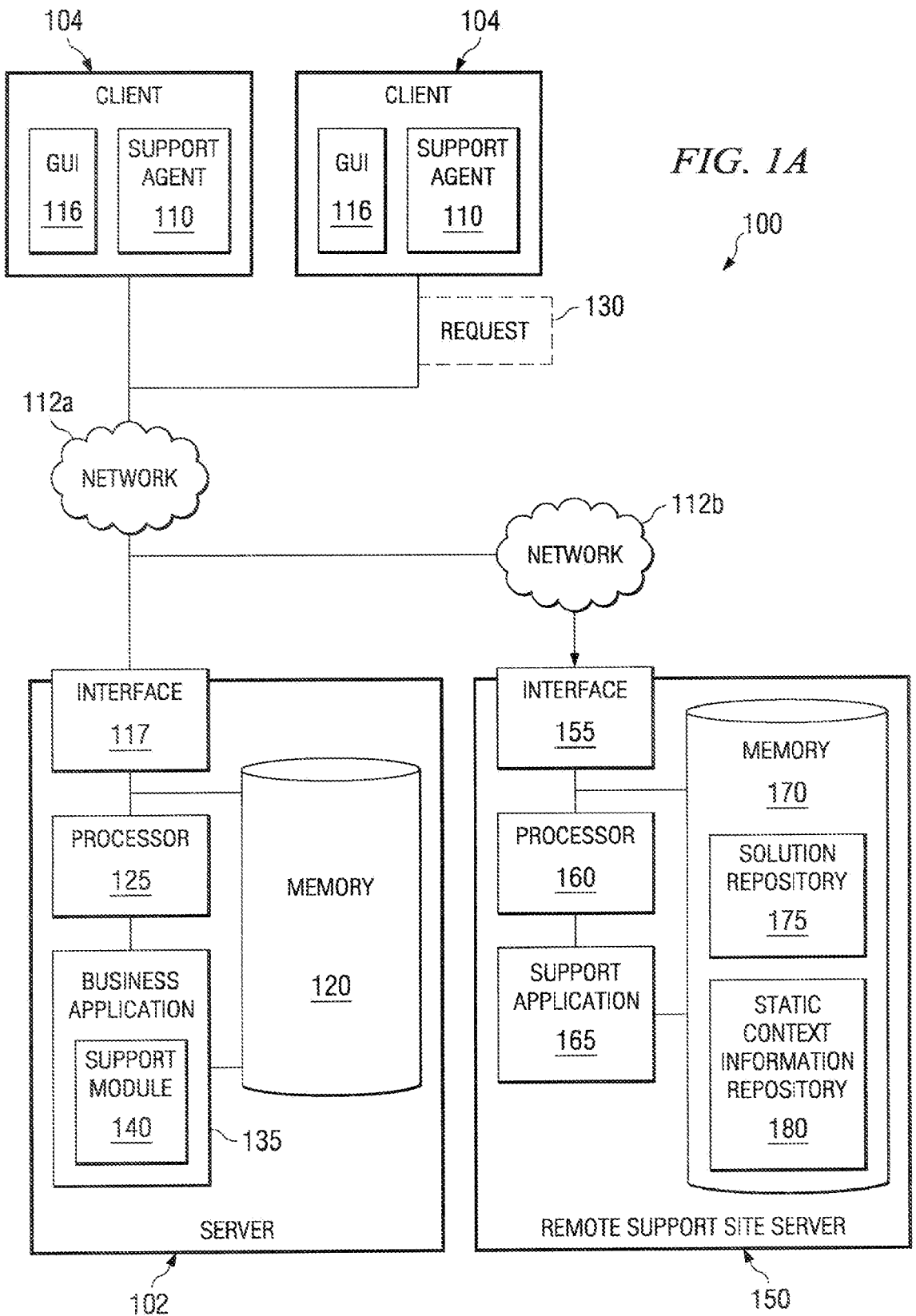
FIG. 1A illustrates a distributed software environment that supports a business application according to a particular implementation of the present disclosure.

FIG. 1A illustrates at least a portion of an enterprise or data processing environment 100 implementing or facilitating the technical support of a business application 135. In accordance with particular implementations, illustrated environment 100 utilizes a business application 135 having an embedded support module 140 in communication with a support application 165 located at a remote support site server 150 in order to provide support to clients 104 running the business application 135. The solution in the present disclosure provides a system and method for supporting a business application 135, giving the solution provider and the client 104 the ability to interact in a more precise and productive manner than in prior solutions. The proffered solution allows for error and dynamic context information collected at the client 104 to be automatically communicated to the remote support site, where additional static context information about the client 304 may be stored. By cross-referencing the data received from the client 104 with the static information already gathered about the client 104, the solution provider may review its collection of solutions for the proper corrective action. By automating the support process, information technology providers and software developers may better serve their customers through a more productive and cost-effective support system, particularly in large, enterprise-based systems where a large number of customers require support.

Turning to FIG. 1A, environment 100 may include or be communicably coupled with a server 102, one or more clients 104, a network 112, and a remote support site server 150. Servers 102 and 150 each include memory 120 and 170, as well as one or more processors 125 and 160, respectively, and comprise electronic computing devices operable to receive, transmit, process, store, or manage data associated with the system. Generally, this disclosure provides merely one example of computers that may be used with the disclosure. As used in this document, the term "computer" is intended to encompass any suitable processing device. For example, the environment 100 may be implemented using computers other than servers, as well as a server pool. Indeed, either of or both server 102 and remote support site server 150 may be adapted to execute any operating system including Linux, UNIX, Windows Server, or any other suitable operating system. According to one embodiment, either server 102 or server 150 may also include or be communicably coupled with a web server and/or a mail server.

Memory 120 and 170 may include any memory or database module and may take the form of volatile or non-volatile memory including, without limitation, magnetic media, optical media, random access memory (RAM), read-only memory (ROM), removable media, or any other suitable local or remote memory component. For example, memory 120 and 170 may store classes, frameworks, applications, backup data, jobs, or other information that includes any parameters, variables, algorithms, instructions, rules, or references thereto. The memory 120 and 170 may also include any other appropriate data such as VPN applications, firmware logs and policies, firewall policies, a security or access log, print or other reporting files, HTML files or templates, and others.

Specifically, memory 120 may include business data that can be utilized by the respective business application 135. Illustrated memory 170 contains two specific data stores: a solution repository 175 and a static information repository 180. The solution repository 175 stores a plurality of errors that may occur during the operation of business application 135 and a plurality of solutions related to the plurality of errors. The plurality of solutions may be provided by the support provider, and in some embodiments, by users who successfully solved a technical issue in the business application 135 and submitted the solution to the solution provider. In some embodiments, solutions provided by users may be denoted as such to distinguish between the solutions provided by the support provider. Therefore, users attempting to correct a technical error may be provided a clear statement regarding a particular solution's origin before basing their course of action on that particular solution. The solution repository 175 may be organized using various keys such as the screen where the error occurred, the module the error occurred in, the application related to the error, as well as other discernable categories. In some embodiments, solution repository 175 may be implemented by a plurality of individual repositories, each specific to particular business applications 135. There, one remote support site server 150 may be the support site for a plurality of applications 135 and the support application 165 may access the particular solution repository 175 corresponding to error in the current situation. In addition to the solutions, the solution repository 175 may include metrics and other reported information regarding each solution such as their relative success or failure, the ease of enacting a particular solution, or any other suitable metric.

The static context information repository 180 stores static information relating to each of the particular clients 104 registered to use the business application 135. Some examples of the static information collected in the static context information repository 180 include the customer type, the type of client 104, the release or version of business application 135, contractual limitations or requirements, service levels, and other information that remains relatively static in the normal course of operation. Some of the static context information may be collected the first time a particular client 104 accesses the business application 135. In those embodiments, the support agent 110 may collect a particular set of static data and provide the information to the support module 140 where it may be sorted and communicated to the support application 165 for storage in the static context information repository 180. In other embodiments, the support agent 110 may provide the static information directly to the remote support site server 150 and the support application 165 via the network 112. In still other embodiments, the information may be a required submission prior to registering and/or accessing the business application 135. Of course, such static information may change over time or in response to certain events (such as a pricing increase, change in licensing terms, employee turnover, software or equipment upgrades, etc.), but are generally stored at the service provider as such information may span (or apply to) a multitude of errors. When one of these errors occurs, a combination of the error information, dynamically determined context information, and the static context information may be combined to find more appropriate solutions within the solution repository 175.

Illustrated servers 102 and 150 also include processors 125 and 160, respectively. Each processor executes instructions and manipulates data to perform the operations of the associated server such as, for example, a central processing unit (CPU), a blade, an application specific integrated circuit (ASIC), or a field-programmable gate array (FPGA). Although described as a single processor in the servers 102 and 150, multiple processors 125 and 160 may be used according to particular needs and references to processor 125 and 160 are meant to include multiple processors where applicable. In this particular illustration, processor 125 executes the business application 135 and the support module 140, while processor 160 executes the support application 165.

Figure 1B:
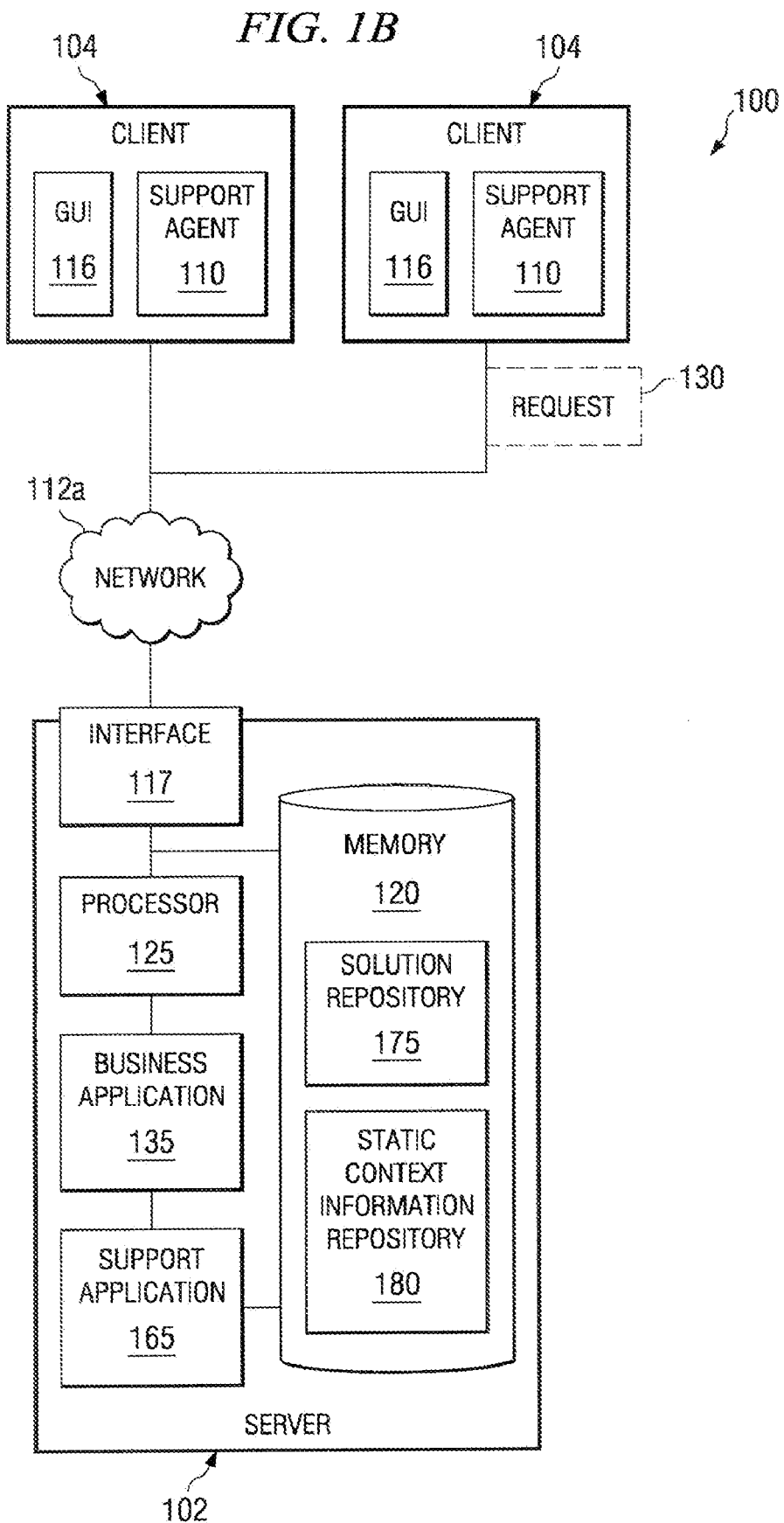
FIG. 1B illustrates a hosted software environment that supports a business application according to another implementation of the present disclosure.

At a high level, business application 135 is any application, program, module, process, or other software that may execute, change, delete, generate, or otherwise manage business information according to the present disclosure. In certain cases, environment 100 may implement a composite application 135. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to server 102, one or more processes associated with application 135 may be stored, referenced, or executed remotely. For example, a portion of application 135 may be a web service that is remotely called, while another portion of application 135 may be an interface object bundled for processing at remote client 104. Moreover, application 135 may be a child or sub-module of another software module or enterprise application (not illustrated) without departing from the scope of this disclosure. Indeed, as shown at FIG. 1B, application 135 may be a hosted solution that allows multiple parties in different portions of the process to perform the respective processing. For example, client 104 may access business application 135 on server 102 or even as a hosted application located over network 112 without departing from the scope of this disclosure. In another example, portions of business application 135 may be used by the customer working directly at server 102, as well as remotely at client 104. In yet another example, business application may be hosted by a third party relatively unrelated to either the customer (represented in this case as client 104) or the service provider (represented in this case as server 150).

Business application 135 includes the support module 140, which may be embedded within the business application 135 as shown in FIG. 1A, or instead may be communicably coupled to the business application 135 within server 102. The support module 140 may be an agent or module running on server 102 that communicates information to and receives information from the support agent 110 on the client 104. Additionally, the support module 140 may provide interaction between the support application 165 of the remote support site server 150 and the business application 135 of server 102. In one embodiment, error and dynamic context information captured at a support agent 110 may be relayed to the support module 140 via the network 112 and business application 135. Once the information is received by the support module 140, the module 140 may format the data for transfer to and communication with the support application 165. The support module 140 may contain the programming for communication with the support application 165 located at the remote support site server 150, or it may provide the formatted information to the business application 135 for further communication with the support application 165. Using network 112, the error and dynamic context information may be relayed to the support application 165. The support module 140 may be a software application capable of performing the support tasks for the business application 135, or it may be an instance of the support application 165. The support module's 140 functionality may be limited to collecting information from the support agent 110 and communicating with the remote support she server 150, or its functionality may offer more robust capabilities, such as acting as the master of the support agent 110 during client 104 sessions using the business application 135. In some embodiments, the support module 140 may provide support functions to the server 102 when the server 102 and the remote support site server 150 are unable to communicate over the network 112.

Support application 165, executed by processor 160, may be any application, program, module, process, or other software that may execute the support functions and processes according to the present disclosure. Support application 165 may also include the capabilities to access, query, change, delete, generate, or otherwise manipulate the elements within memory 170, the solution repository 175, and the static context information repository 180, in addition to any other repositories within memory 170. In certain embodiments, support application 165 may be able to communicate with the business application 135 and its associated support module 140 to send and receive support information relevant to the business application 135. In other embodiments, the support application 165 may be operable to communicate with the support agent 110 such that it may control the support agent 110, as well as send data to or receive data from the agent 110. Further, while illustrated as internal to support site server 150, one or more processes associated with application 165 may be stored, referenced, or executed remotely. For example, a portion of application 165 may be a web service that is remotely called, while another portion of application 165 may be an agent, such as agent 110, bundled for processing at remote client 104. Moreover, application 165 may be a child or sub-module of another software module or enterprise application (not illustrated) without departing from the scope of this disclosure.

Additionally, the servers 102 and 150 may include interfaces 117 and 155 for communicating with other computer systems, such as clients 104 or with each other over the network 112, in a client-server or other distributed environment. Generally, interfaces 117 and 155 comprise logic encoded in software and/or hardware in a suitable combination and operable to communicate with the network 112. More specifically, interfaces 117 and 155 may comprise software supporting one or more communications protocols associated with communications such that the network 112 or hardware is operable to communicate physical signals.

The network 112 facilitates wireless or wireline communication between the server 102 and any other local or remote computer, such as the clients 104. Indeed, while illustrated as two networks, 112a and 112b respectively, network 112 may be a continuous network without departing from the scope of this disclosure, so long as at least a portion of network 112 may facilitate communications between senders and recipients of requests 130, and results. The network 112 may be all or a portion of an enterprise or secured network. In another example, the network 112 may be a virtual private network (VPN) merely between the server 102 and the client 104 across wireline or wireless link. Such an example wireless link may be via 802.11a, 802.11b, 802.11g, 802.20, WiMax, and many others. In other words, the network 112 encompasses any internal or external network, networks, sub-network, or combination thereof operable to facilitate communications between various computing components in the system. The network 112 may communicate, for example, Internet Protocol (IP) packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, the network 112 may be a secure network associated with the enterprise and certain local or remote clients. In the present environment 100, the server 102 and the remote support site server 150 are connected by the network 112. Regardless of its other connections, network 112 may provide a connection between interface 117 of the server 102 and interface 155 of the remote support site server 150. Using the network 112, communications between the support module 140 and the support application 165 may be delivered and received.

The client 104, illustrated in FIG. 1A, is any computing device operable to connect or communicate with server 102, server 150, or the network 112 using a wireline or wireless connection. At a high level, each client 104 includes at least the GUI 116 and, in some cases an instance of the support agent 110, and comprises an electronic computing device operable to receive, transmit, process and store any appropriate data associated with the backup system. It will be understood that there may be any number of the clients 104 communicably coupled to the server 102. For example, the clients 104 may include one local client and two external clients to the illustrated portion of the network 112. Further, "the client 104," "analyst," and "user" may be used interchangeably as appropriate without departing from the scope of this disclosure. For example, the analyst may access a first instance of the business application 135 on a first, client 104, while an end user may use a second instance of the business application 135 on a second client 104. Moreover, for ease of illustration, each client 104 is described in terms of being used by one user. But this disclosure contemplates that many users may use one computer or that one user may use multiple computers. As used in this disclosure, the client 104 is intended to encompass a personal computer, touch screen terminal, workstation, network computer, kiosk, wireless data port, smart phone, personal data assistant (PDA), one or more processors within these or other devices, or any other suitable processing device. For example, the client 104 may comprise a computer that includes an input device, such as a keypad, touch screen, mouse, or other device that can accept information, and an output device that conveys information associated with the operation of the server 102 or the clients 104, including digital data, visual information, or the GUI 116. Both the input device and output device may include fixed or removable storage media such as a magnetic computer disk, CD-ROM, or other suitable media to both receive input from and provide output to users of the clients through the display, namely the GUI 116.

In FIG. 1A, at least some of the clients 104 include the support agent 110. The support agent 110 may be an agent, daemon, object, service, or other software that is reactive to certain events occurring with respect to the client 104. The support agent 110 may intercept error signals and events concerning the related client 104, or the client 104 may actively supply the support agent 110 with notification of and data regarding the signals and events it receives and/or transmits. In some embodiments, the support agent 110 may determine, based on the error event, the specific technical error, or instead, a code or other marker indicating a certain error has occurred. In other embodiments, the support agent 110 may receive a report from the client 104 describing the error. Additionally, the support agent 110 may analyze or retrieve a set of dynamic context information regarding the client 104 and the business application 135 at the time of the error. Such information may include the particular screen the client 104 was on at the time of the error, the particular machine type of the client 104, and other information that may vary at different instances during operation of the business application 135. As described above, multiple clients 104 may use the business application 135 in the current environment 100. Therefore, the clients 104 and the other computers accessing the business application 135 may have different specifications and software that are relevant to the technical issues experienced. Thus, the support agent 110 may collect this dynamic context information, in addition to any error information, and provide the information to the support module 140 via the business application 135 for further action. In some alternative embodiments, the support agent 110 may provide the information directly to the remote support site server 150 and the support application 165. Moreover, support agent 110 may provide or facilitate the presentation of potential solutions via GUI 116.

GUI 116 comprises a graphical user interface operable to allow the user of the client 104 to interface with at least a portion of environment 100 for any suitable purpose such as to allow the client 104 to interact with the business application 135 and, in the event of a technical error, provide a method of interacting with the support module 140 and the support application 165 for further supporting the business application 135. Generally, the GUI 116 provides the client 104 with an efficient and user-friendly presentation of data provided by or communicated within the system. In particular, GUI 116 may provide the user of business application 135 with access to data stored within memory 120. The GUI 116 may comprise a plurality of user interface (UI) elements such as interactive fields, pull-down lists, and buttons operable at the client 104. These UI elements may be associated with support functions provided by the support module 140 and the business application 135 for requesting or receiving information related to the support application 165. In one embodiment, the GUI 116 may display a list of solutions generated by the support application 165 and organized by the support module 140. In another embodiment, the GUI 116 may provide an interactive display for providing additional information or searches to the support module 140 for communication to the support application 165. In still other embodiments, the GUI 116 may provide an interactive display for providing feedback on solutions used in an attempt to solve the technical error. Moreover, it should be understood that the term graphical user interface may be used in the singular or in the plural to describe one or more graphical user interfaces and each of the displays of a particular graphical user interface. Therefore, the GUI 116 contemplates any graphical user interface, such as a generic web browser, touch screen, or command line interface (CLI) that processes information in environment 100 and efficiently presents the results to the user. The server 102 can accept data from the client 104 via the web browser (e.g., Microsoft Internet Explorer or Mozilla Firefox) and return the appropriate HTML or XML responses using the network 112.

In other implementations (as shown in FIG. 1B), the business application 135, the support application 165, and the memory 120 storing the solution repository 175 and the static information repository 180 are managed by a single provider, as illustrated by the server 102, perhaps as a hosted solution. Notably, the support module 140 from FIG. 1A may not be present, as the business application 135 and the support application 165 may communicate through the internal connections of the server 102. In other cases, the support module 140 may be integrated within the hosted business application 135 or support application 165. Clients 104 may still contain the support agent 110 and connect to the server 102 via the network 112. In such a hosted environment, the client 104 may log in to the remote server 102 and run the business application 135 from a web browser or other similar interface. When an error is reported by or to the support agent 110, the error information and the dynamic context information of the client 104 is sent to the support application 165 communicably coupled to the business application 135. The support application 165 retrieves the static context information from the static context information repository 180 and uses that information to query the solution repository 175 for solutions to errors in a system having the same static and dynamic context as the current error situation.

Figure 2:
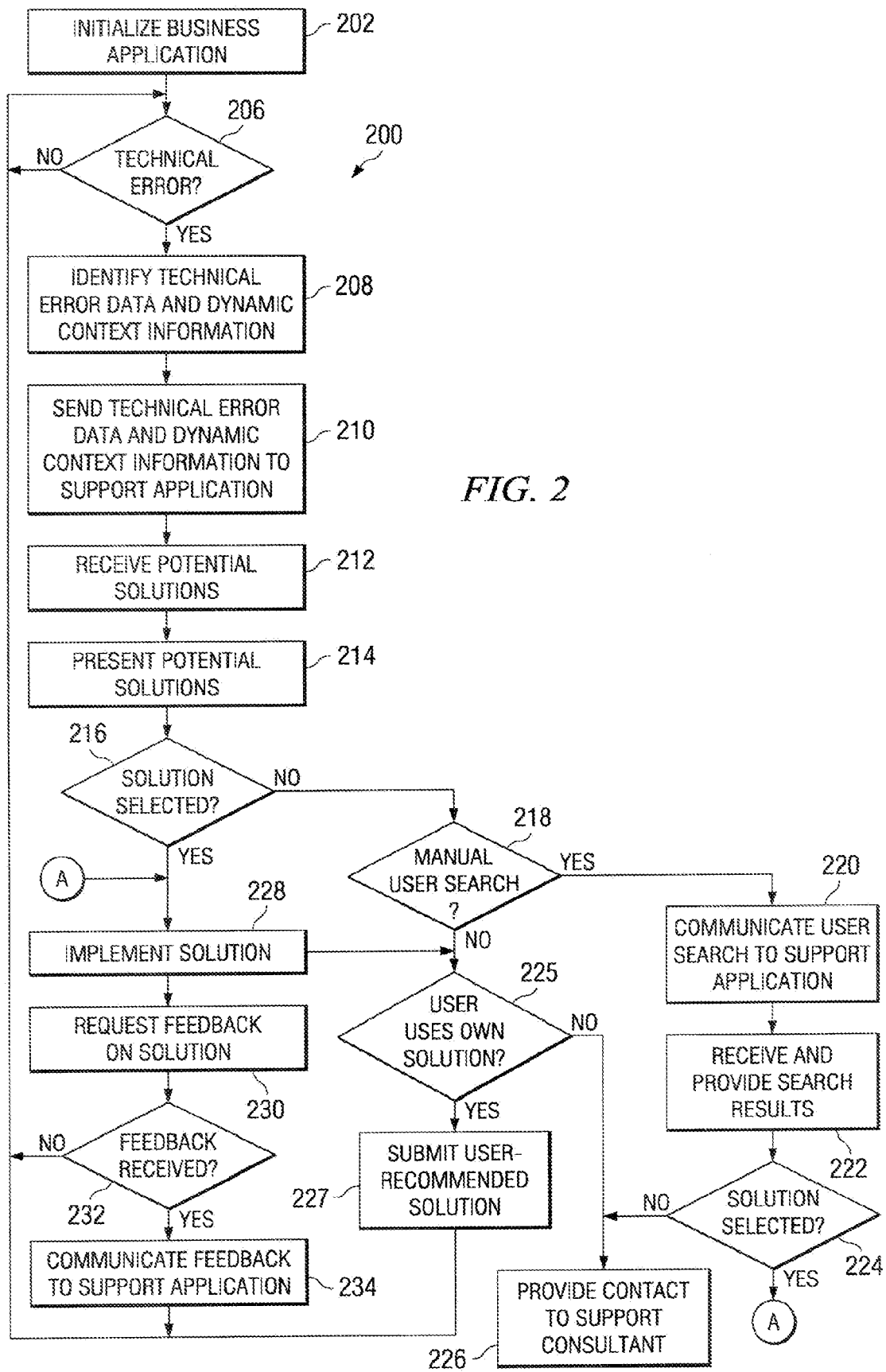
FIG. 2 is a flowchart illustrating an example of the steps for supporting a business application from the perspective of the business application within the illustrated environment of FIG. 1A.

FIG. 2 provides a flowchart illustrating an example process 200 for supporting the business application 135 in environment 100 as illustrated in FIG. 1A, as seen from the perspective of the business application 135. At step 202, the business application is initialized. In some embodiments, initialization may occur as a result of a signal from one of the clients 104, while in others initialization may occur upon startup of the server 102. Until the decision at step 206 is "yes," indicating that a technical error has occurred, business application 135 may continue to operate according to its general programming. However, once a technical error occurs at step 206, support process 200 continues. At step 208, dynamic context information and data relating to the particular error experienced are identified. In some embodiments, the business application 135 and its related support module 140 receive this information from the support agent 110. Support agent 110 may collect the information at the client 104 and communicate it to the business application 135. Once the information arrives at the business application 135, the support module 140 may organize and prepare the information for transmission to the support application 165. At step 210, the support, module 140, via the business application 135, may send the dynamic context information and technical error data to the support application 165 for processing. Once the relevant data is sent to the support application 165, the business application 135 may attempt to continue normal application activity, or the business application 135 may wait for a response from the support application 165 prior to any additional work in the application.

At step 212, the business application 135 receives the potential solutions from the support application 165. At step 214, the business application 135 arranges the potential solutions and presents them to the user on the GUI 116. In some embodiments, the potential solutions may include metric information that may allow for sorting of the potential solutions. Some examples of the metrics that may be available are customer types, solution success/failure rates, a rating of the ease in implementing the solution, and ratings from other customers enacting the solution. Once the solutions are presented, the user may be able to interact with the data to sort according to the metrics included with the received potential solutions. This may allow for users to find the best solution for the current situation when a plurality of potential solutions is provided. At step 216, a determination of whether any of the solutions received at step 212 are selected by the user is made. In some instances, a particular one of the plurality of solutions may provide an acceptable solution to the error that occurs.

When that is the case, the user may interact with the GUI 116 to indicate his selection of the solution. The solution, which may be an automated process that occurs at the client 104 or the server 102, or which may be a series of manual steps for the user to take, is implemented at step 228. If, however, none of the plurality of solutions is selected by the user, then the process 200 moves to step 218. At step 218, the user may have the option of entering a manual set of search criteria for the solution repository 175. A manual search box may be included in the GUI 116 presented to the user during the solution process. If the user does not provide manual search criteria, then process 200 moves to the optional step 225, where the user may choose to implement a solution of the user's creation. Because the solution repository 175 may not include every possible solution, it is possible that a technically-savvy user may be able to generate his own solution to the technical error. If so, then the new solution may be implemented at step 225. At step 227, the user may choose to submit the new solution to the support application 165 via the GUI 116. In order to access a form for submitting the new solution, the user may need to indicate to the business application 135 that the user solved the error with a new solution and wishes to submit it to the solution repository 175. Thus, step 227 allows the user to communicate with the remote support site server 150 and send the new solution to be added to the plurality of solutions currently stored within the solution repository 175. Once the new solution is submitted at step 227, the process 200 may move to step 204 such that the business application 135 may operate normally. If, however, the user does not create and submit a new solution at steps 225 and 227, process 200 moves to step 226 where a communications line to a support consultant may be provided so that the consultant can work with the user to procure a solution to the technical error. Some examples of providing communications with a support consultant may be embodied by opening an instant messaging session with the consultant using a messaging protocol, providing a VoIP call to the consultant at a call center, or providing a direct access phone number to the consultant for an immediate response.

If, however, the business application 135 receives a user's manual search at step 218, the business application 135 receives the search criteria, parses the data into the correct transmission medium, and communicates the criteria to the support application 165 at step 220. Once the search criteria is communicated, the business application 135 may wait for the results to be delivered. At step 222, the business application 135 receives the search results, a set of potential solutions based on the user search criteria, and presents the results to the client 104. The business application 135 may wait for an indication from the client 104 that one of the solutions has been selected at step 224. If a solution is selected from the returned data set, process 200 continues to step 228, wherein the solution is implemented. If none of the returned solutions are selected, the business application 135 moves to step 226, wherein a connection with the support consultant is provided according to the previous description.

Figure 5:
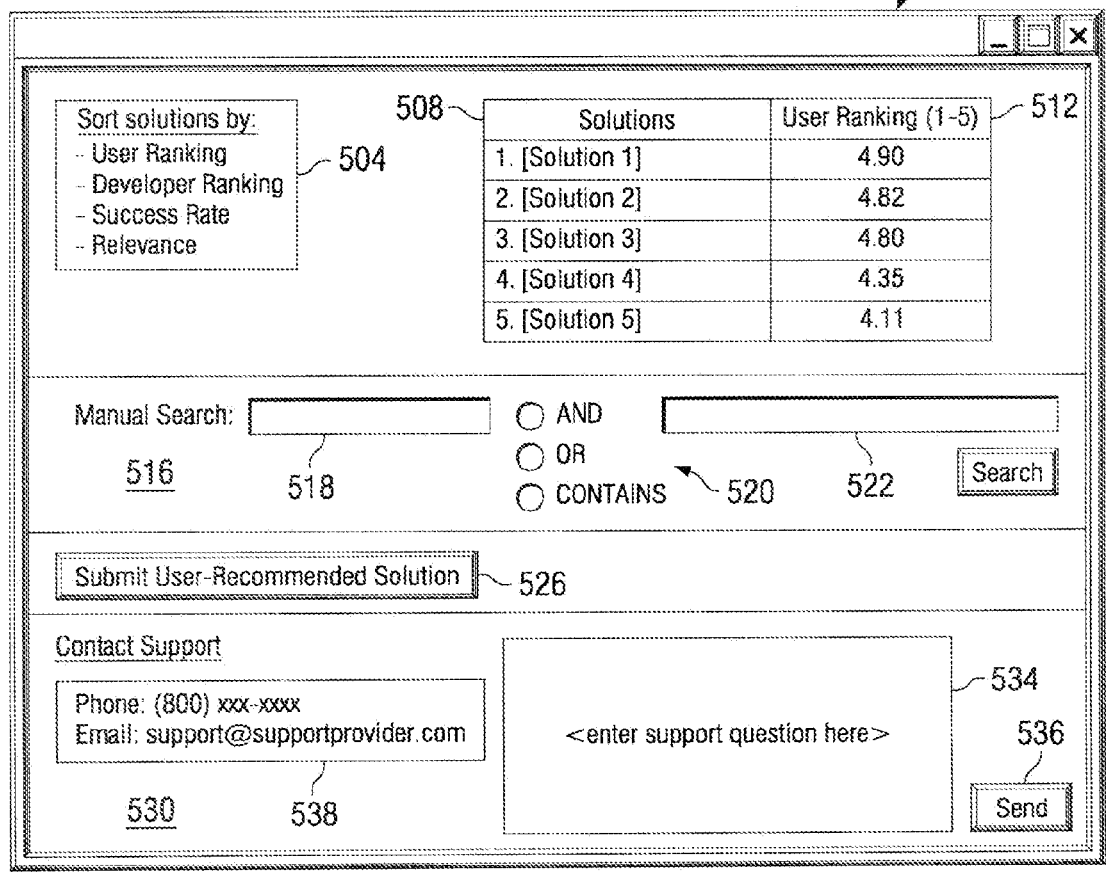
FIG. 5 illustrates one embodiment of the visual interface provided by the support application within the illustrated environment of FIG. 1A.

FIG. 5 illustrates one embodiment of the GUI 116 when a first set of solutions is received by the business application 135. This GUI 116 illustrated In FIG. 5 may be the entire GUI 116 presented at the client 104, or it may be embedded in the GUI 116. Elements representing the steps described above may be found within the visual interface provided. The potential solutions received at step 212 are represented by table 506. The interface illustrated in FIG. 5 shows two columns in table 506: a solution column 508 and a metric column 512. The solution column 508 provides a listing of the potential solutions received by the business application 135, sorted according to a default setting. The default setting may be based on the relevance of the solutions according to the information provided to the support application 165 or the ratings given to the particular solution by previous users, in addition to a plurality of other metrics associated with the individual solutions. The metric column provides the user with a clear listing of the metric value associated with the particular solution listed. In some instances, users may desire to view the solutions as sorted by a different metric. To do so, the soil element 504 allows the user to select the metric on which the solutions will be sorted. Sort element 504 currently lists only four bases for sorting: user ranking, developer ranking, success rate, and relevance. In certain embodiments, other metric fields associated with the solutions may be included within the sort element 504. Metric ranking field 512 provides the user with the calculated metric value at the time the solution was retrieved from the solution repository 175. Because the metric values may be recalculated after the metric is retrieved, a second user subsequently accessing the same solutions present in FIG. 5 may be provided with different metric values after the recalculation.

The GUI 116 provides a manual search area 516 corresponding to step 218 of process 200, where the user may elect to perform a search of solutions independent of the solutions automatically returned by the support application 165. Using text fields 518 and 522, along with the Boolean radio boxes 520, the user may specify the type of search desired. In other embodiments, alternative methods for performing the manual search and for providing tire manual search criteria may exist. Below the manual search area, a user solution button 526 may be engaged. By activating this UI element, the user may be given the opportunity to submit a user-recommended solution. This process is further detailed in the description corresponding to FIG. 4. Further, contact support area 530 provides the user with the ability to contact customer support at any time during the support process. In the current embodiment, three methods of contact are provided. First, instant messaging module 534 allows users to initiate an instant messaging session with a support consultant. The user may type an initial question or statement in the module 534, and activate the "send" UI element 536. The message will be sent to the support consultant and an instant messaging session implemented. In some embodiments, an instant messaging window may open to facilitate the session. In addition to the instant messaging module 534, alternative contact information 538 may be included. In the current embodiment, both an email address and toll-free hotline number are offered. If the user prefers those methods over instant messaging, this information may be used to contact one of the support consultants.

Figure 6:
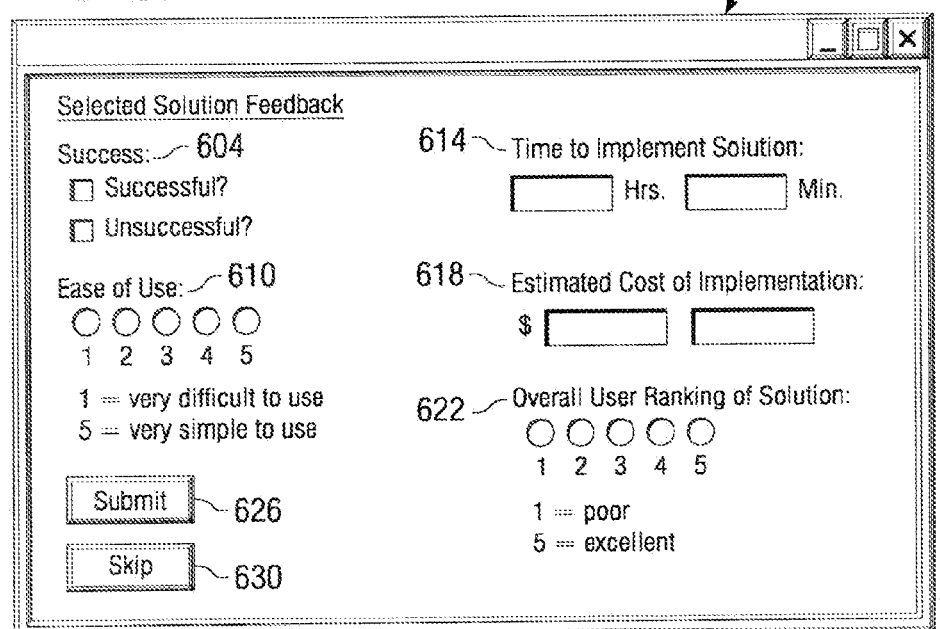
FIG. 6 illustrates one embodiment of the visual interface viewed by users for providing feedback related to an accepted solution within the illustrated environment of FIG. 1A.

Returning to FIG. 2, once the selected solution is implemented, the business application 135 may prompt tire user for feedback on the selected solution at step 230. In some embodiments, this prompting may include displaying a brief survey on the GUI 116. Other methods of acquiring the feedback may also be applied. FIG. 6 provides an illustration of one embodiment where feedback data is collected by an interactive survey provided to the user via the GUI 116. Some example feedback questions include a check box 604 to indicate whether the solution was successful, a selection 610 to indicate the solution's ease of use, a text box 614 for the estimated time it took to implement the solution, a text box 618 for the estimated cost of implementing the solution, and a selection 622 for the overall ranking of the solution in general. Additional feedback questions may be included in other embodiments, while some listed in FIG. 6 may be omitted. Regardless, once the survey is complete, the user may activate the "Submit" UI element 626, shown here as a button. Activating the "Submit" element will cause the survey information to be submitted. By activating the "Skip" UI element 630, users may choose not to provide feedback. Additionally, the survey may time out after a predetermined amount of time has passed. If no feedback is received at step 232, the business application returns to normal operations. If, however, feedback is received from the user, the data is collected by the application 135 and communicated to the support application 165 of FIG. 1A at step 234. Once the information has been communicated, the business application 135 may return to normal business operations.

Figure 3:
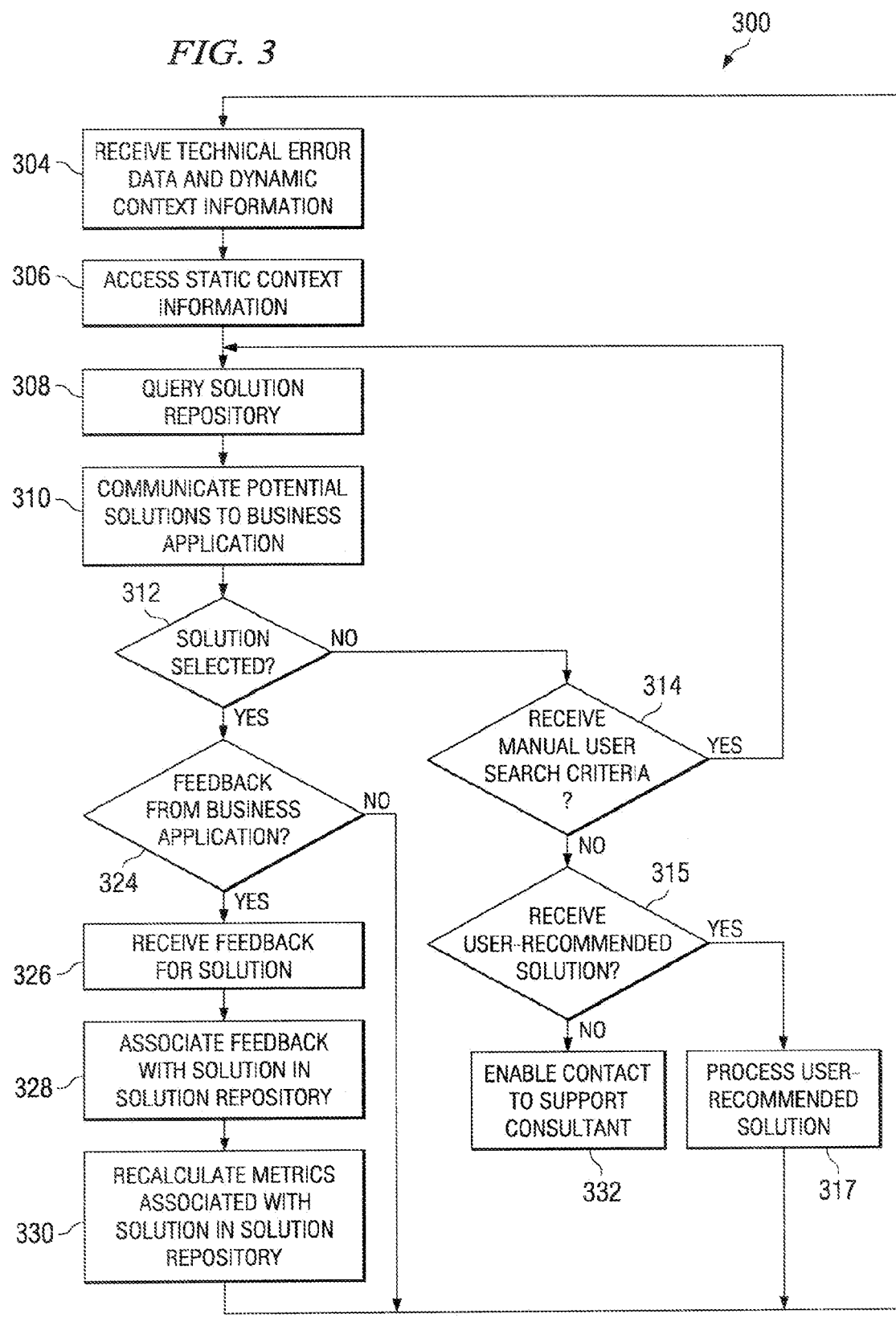
FIG. 3 is a flowchart illustrating an example of the steps for supporting a business application from the perspective of a support application within the illustrated environment of FIG. 1A.

While the business application 135 performs the steps of process 200, the support application 165 simultaneously performs the corresponding steps of process 300 at the remote support site server 150. FIG. 3 provides a flowchart illustrating one embodiment of process 300 from the perspective of the support application 165. At step 304, the support application 165 receives technical error data and dynamic context information from the solution module 140 via the business application 135. From the information received, the support application 165 may determine which client 104 or other system is malfunctioning. Once the specific system in question is determined, the support application 165 may access and retrieve that system's static context information from the static context information repository 180. By combining the static and dynamic context information for the system with the error information received, the support application 165 may query the solution repository 175 for solutions corresponding to the present data set at step 308. Depending on the error and available context information, any number of solutions may result from the query. In some embodiments, the support application 165 may include functionality for determining which of the solutions may be considered relevant enough to send back to the business application 135. In other embodiments, the solutions returned may be limited to a certain number or to those meeting certain threshold characteristics. Those threshold characteristics may relate to the metrics stored with each solution in the solution repository 175. If a particular solution has been successful in 50% of its attempted uses, then the support application 165 may consider it relevant and return the solution to the business application 135. In still other embodiments, each solution returned by the query of step 308 may be communicated to the business application 335. The business application 135, as opposed to the support application 165, may then use its own functionality to determine which solutions should be presented to the client 104.

At step 310, the potential solutions identified by the solution application's 165 query may be communicated to the business application 135 over the network 112. Once the solutions are sent, the solution application 165 waits for notification that one of the provided solutions was selected at step 312. In some instances, the support application 165 may wait a predetermined amount of time before determining that one of the solutions was not selected. In other embodiments, a signal from the business application 135 may be received indicating that the user has declined all potential solutions. Where none of the solutions provided by the support application 165 have been selected, process 300 may continue to step 314, where a determination as to whether the application 165 has received manual user search criteria is made. If the support application 165 receives manual user search criteria at step 314, process 300 returns to step 308, where the support application 165 queries the solution repository 175 with the manual search criteria, the error information, the dynamic context information, and the static context information. Process 300 continues with step 310, where the support application 165 may communicate the potential solutions returned by the query to the business application 135 over the network 112. Once the potential solutions from the query including the manual search criteria are communicated, then the process 300 returns to step 312 where it is determined whether one of the potential solutions is accepted by the user. If one of the solutions is accepted, process 300 moves to step 324.

Some embodiments may provide users with the ability to add their own solutions to the solution repository 175. In those embodiments, if no manual user search is received at step 314, then at step 315 the support application 165 may determine whether a user-recommended solution is received with instructions to add the new solution to the solution repository 175. If the user does not submit a recommended solution at step 315, process 300 continues to step 322 where communications with the support consultant may be enabled. If, however, a new solution has been submitted, the support application 175 processes the user-recommended solution in the solution repository 175 at step 317.

Figure 4:
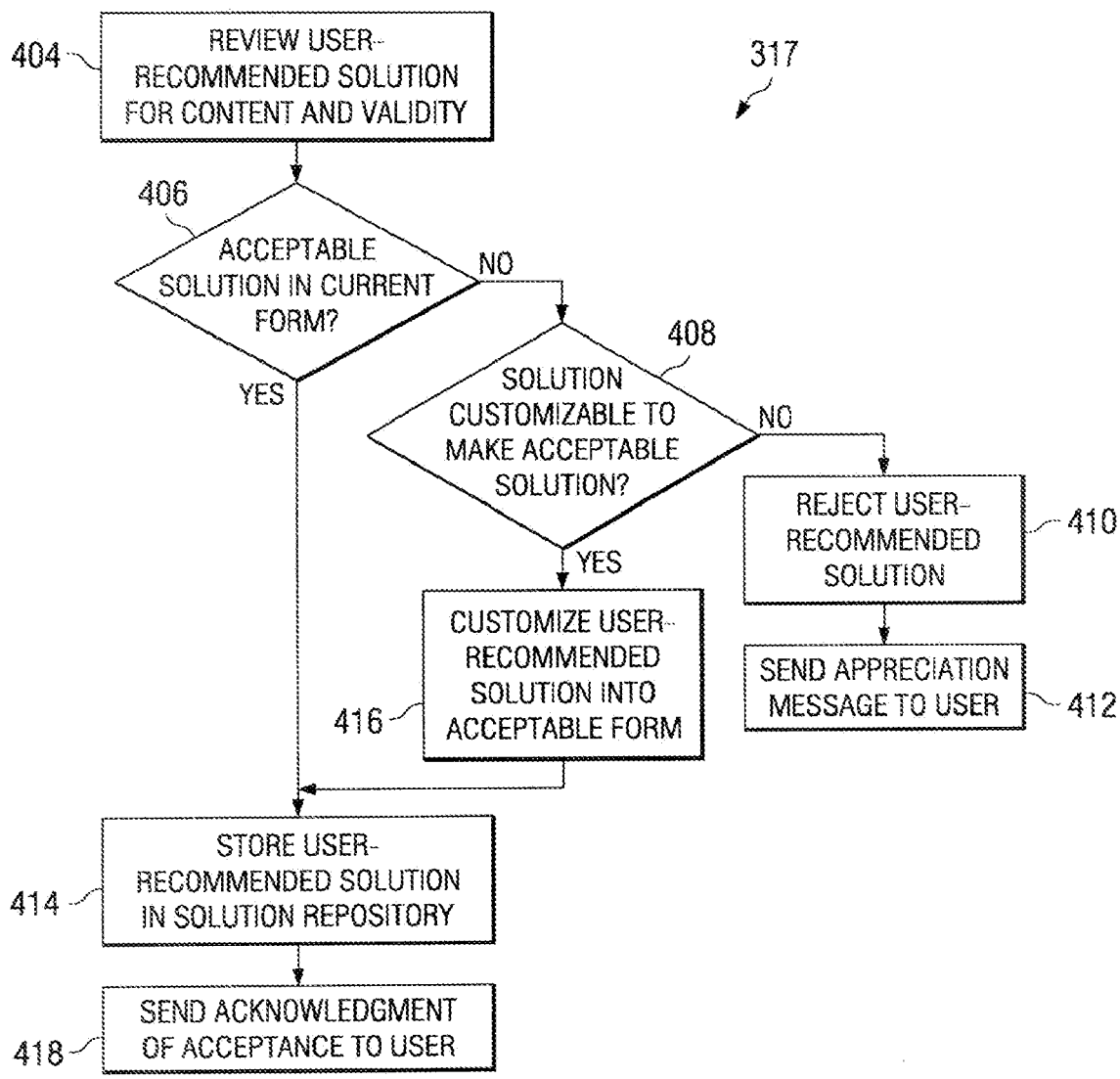
FIG. 4 is a flowchart diagram illustrating one example method for receiving, analyzing, and storing a user-recommended solution within the context of FIG. 3.

FIG. 4 provides one technique for processing the user-recommended solution illustrated at step 317. Before the user-recommended solution is accepted, the support application 165, or the support consultant with access to the support application 165 and the user-recommended solution, may review the new solution for acceptable content, validity, and accuracy at step 404. This review may include determinations as to whether the user-recommended solution is in the proper format, whether the solution actually solves the associated technical error, and whether the solution may be repeated by other users according to the information received at the support application 165. At step 406, the support application 165 determines whether, in its submitted format, the user-recommended solution is acceptable. If the user-recommended solution is acceptable, then the support application 165 may add the solution to the solution repository 175. In some embodiments, the stored user-recommended solution may include a field indicating that the solution's origin was from the user and not the solution provider, in order to provide other users with full disclosure. In some embodiments, after the user-recommended solution is stored, the support application 165 may generate an acknowledgement of the solution's acceptance, and include a message of thanks to the user for his efforts in improving the support application 165 and solution repository 175. In some instances, an accepted solution may result in the support provider crediting the submitting user for future services. This incentive may prove to generate more user-recommended solutions and allow for constant enhancement of the support process for the support provider's customers.

If the solution is not acceptable in its current form, however, then at step 408 a determination is made of whether the solution may be customized by the support application 165 (or the support consultant) into an acceptable solution. If the solution is customizable, then the support application 165 (or the support consultant) may customize the solution into an acceptable form at step 416. In some instances, the customization may include only minor changes to the original user-recommended solution. In other instances, more substantial changes may be necessary to make the user-recommended solution acceptable. If the changes to make the user-recommended solution conform (or be compatible) with the support application 165 are too substantial, then the support application 165 may choose to reject the solution even though the solution could be modified for submission. Once the user-recommended solution is customized into an acceptable form, the support application 165 may store the solution at step 414 as previously described. If the solution cannot be modified into an acceptable form, then the support application 165 may reject the user-recommended solution at step 410. In optional embodiments, once the decision to reject the user-recommended solution is made, step 412 generates a message to the submitting user thanking them for their submission. Regardless of whether the user-recommended solution is accepted or rejected, once step 317 is complete, the process may return to step 304, where the support application 165 continues to receive information from the business application 135 regarding other errors occurring in environment 100.

Returning to FIG. 3, whenever a solution is accepted, process 300 moves to step 324. There, the support application 165 determines whether the business application 135 has communicated feedback received from the user regarding the implementation of the accepted solution. The feedback may include a determination of the particular solution's success or failure, a rating for the solution's ease of use and effectiveness as determined by the user, as well as other metrics associated with the particular solution. In some embodiments, the support application 165, having provided the potential solutions to the business application 135, may wait for the business application 135 to communicate any feedback regarding an accepted solution before performing further tasks with respect to the current error. The determination of whether feedback is provided may be determined in some instances by whether feedback was communicated within a predetermined amount of time, or in other circumstances by the receipt of a signal indicating that the user did or did not provide feedback at the client 104. In situations where it is determined that no feedback was provided by the business application 135, process 300 returns to step 304 and begins the process of receiving a new set of error and dynamic context information from the business application 135. However, if the business application 135 does provide feedback, then that feedback is received at step 326. At step 328, the support application 165 may associate the feedback with the accepted solution in the solution repository 175, and the new information may be stored with the solution for use by other users experiencing similar errors. Finally, at step 330, the support application 165 recalculates the various metrics associated with the accepted solution in the solution repository 175. Thus, the metrics may be updated prior to offering the solution in response to another error. Once the recalculation is complete, the support application 165 may return to step 304, where new technical error and dynamic context information may be received such that process 300 may be run again.

While the preceding flowcharts and accompanying descriptions illustrate exemplary methods 200 and 300, in addition to the exemplary sub-steps of step 317, environment 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, environment 100 may use methods with additional steps, fewer steps, and/or different steps, so long as the method remains appropriate.

Although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. An article comprising software for supporting a business application, the software comprising instructions stored on a tangible computer readable medium and operable when executed by a processor to:
   determine that a technical error associated with the business application has occurred;
   automatically communicate the technical error and dynamic context information to a remote support site, the dynamic context information at least partially identifying the particular execution point of the business application;
   receive at least two potential solutions for the technical error, the at least two potential solutions determined using at least the communicated technical error, the dynamic context information, and static information collected at the support site, wherein each of the at least two potential solutions is associated with a plurality of metrics, the plurality of metrics comprising a customer type, a solution success/failure rate for the particular solution, an implementation ease of use rating for the particular solution, and customer ratings for the particular solution;
   compare at least one of the plurality of metrics associated with each of the at least two received potential solutions to a predetermined metric threshold characteristic; and
   present each of the at least two potential solutions where the at least one of the plurality of metrics for the particular solution exceeds the predetermined metric threshold characteristic to a user of the business application via an interface.

2. The article of claim 1, the instructions further operable when executed to prioritize the at least two presented potential solutions at least according to a particular one of the at least one metrics associated with the at least two potential solutions.

3. The article of claim 1, the instructions further operable when executed to receive ratings associated with at least one of the at least two potential solutions from the user for inclusion in the metrics associated with the at least one of the at least two potential solutions.

4. The article of claim 3, the instructions further operable when executed to:
   present a feedback screen with the interface;
   automatically communicate received ratings associated with at least one of the at least two potential solutions to the remote support site for recalculation of at least one of the plurality of metrics; and
   recalculate at least one of the plurality of metrics for at least one of the at least two presented potential solutions.

5. The article of claim 1, the instructions further operable when executed to:
   receive manual search criteria from the user after presenting each of the at least two potential solutions;
   automatically communicate the received manual search criteria from the user to the support site; and
   receive at least one additional potential solution for the technical error, the additional potential solution determined using at least the received manual search criteria, the communicated technical error, the dynamic context information, and the static information collected at the support site, and wherein the at least one of the plurality of metrics for the at least one additional potential solution exceeds the predetermined metric threshold characteristic.

6. The article of claim 1, the instructions further operable when executed to:
   connect the user to a remote support provider through the interface; and
   provide the remote support provider with the technical error and the dynamic context information.

7. The article of claim 1, the instructions further operable when executed to:
   receive a user-recommended solution associated with the technical error; and
   automatically communicate the user-recommended solution to the remote support site for subsequent storage and presentation.

8. The article of claim 1, wherein the instructions operable when executed to present the at least two potential solutions to the user of the business application comprise instructions operable when executed to distinguish the at least two solutions presented to the user that are user-provided solutions.

9. An article comprising software for supporting a business application, the software comprising instructions stored on a tangible computer readable medium and operable when executed by a processor to:
   receive a technical error and dynamic context information associated with a business application from a first client, the dynamic context information at least partially identifying the particular execution point of the business application;
   access static context information associated with the business application;
   query a solution repository for a first set of at least two potential solutions, the query determined using at least the received technical error, the dynamic context information, and the accessed static context information, where each of the potential solutions in the solution repository is associated with a plurality of metrics, the plurality of metrics comprising a customer type, a solution success/failure rate for the particular solution, an implementation ease of use rating for the particular solution, and customer ratings for the particular solution;
   compare at least one of the plurality of metrics associated with each of the first set of at least two potential solutions to a predetermined metric threshold characteristic; and
   automatically communicate each of the first set of at least two potential solutions returned by the query where the at least one of the plurality of metrics for the particular potential solution exceeds the predetermined metric threshold characteristic to the business application.

10. The article of claim 9, the instructions further operable when executed to:
   receive specific manual search criteria from the business application after automatically communicating each of the first set of at least two potential solutions returned by the query, the specific manual search criteria provided by the first client;
   query the solution repository for an additional set of at least two potential solutions, the query determined using at least the received specific manual search criteria, the received technical error, the dynamic context information, and the accessed static information associated with the business application; and
   automatically communicate the additional set of at least two potential solutions returned by the query to the business application for the first client.

11. The article of claim 9, the instructions further operable when executed to receive feedback from the first client associated with at least one potential solution included in the communicated first set of at least two potential solutions.

12. The article of claim 9, the instructions further operable when executed to:
  receive a second technical error and a second set of dynamic context information associated with a business application from a second client unassociated with the first client, the second set of dynamic context information at least partially identifying a particular execution point of the business application associated with the second client;
  access a second set of static context information associated with the second client, the second set of static context information associated with the business application;
  query the solution repository for a second set of at least two potential solutions, the solutions determined using at least the second received technical error, the second dynamic context information, and the accessed second set of static context information;
  compare at least one of the plurality of metrics associated with each of the second set of at least two potential solutions to a second predetermined metric threshold characteristic; and
  automatically communicate each of the second set of at least two potential solutions returned by the query to the business application for the second client, where the at least one of the plurality of metrics for each of the communicated second set of at least two potential solutions exceeds the predetermined metric threshold characteristic.

13. The article of claim 12, wherein the second set of at least two potential solutions communicated to the second client is sorted according to at least one of the plurality of metrics associated with each of the one or more potential solutions.

14. The article of claim 13, the instructions further operable when executed to:
  receive feedback from the first client associated with the first set of at least two potential solutions after communicating the first set of at least two potential solutions to the first client and prior to querying the solution repository for the second set of at least two potential solutions; and
  recalculate the metrics associated with each of the at least two potential solutions in the solution repository, prior to sorting the second set of at least two potential solutions for the second client, at least partially based on the feedback received from the first client.

15. The article of claim 14, wherein the second set of potential solutions comprises a differently sorted instance of the same potential solutions as the first set of potential solutions.

* * * * *